(12) United States Patent
Engelen et al.

(10) Patent No.: US 9,852,629 B2
(45) Date of Patent: Dec. 26, 2017

(54) METHODS AND SYSTEMS FOR TRACKING A VEHICLE'S POSITION USING A PLURALITY OF LIGHT SENSORS

(71) Applicant: PHILIPS LIGHTING HOLDING B.V., Eindhoven (NL)

(72) Inventors: Dirk Valentinus Rene Engelen, Heusden-Zolder (BE); Bernt Meerbeek, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

(21) Appl. No.: 14/903,292

(22) PCT Filed: Jul. 4, 2014

(86) PCT No.: PCT/IB2014/062845
§ 371 (c)(1),
(2) Date: Jan. 7, 2016

(87) PCT Pub. No.: WO2015/004581
PCT Pub. Date: Jan. 15, 2015

(65) Prior Publication Data
US 2016/0379495 A1 Dec. 29, 2016

Related U.S. Application Data

(60) Provisional application No. 61/843,950, filed on Jul. 9, 2013.

(51) Int. Cl.
*G08G 1/14* (2006.01)
*G08G 1/005* (2006.01)
(Continued)

(52) U.S. Cl.
CPC ............ *G08G 1/144* (2013.01); *G08G 1/005* (2013.01); *G08G 1/017* (2013.01); *G08G 1/04* (2013.01);
(Continued)

(58) Field of Classification Search
CPC ........ Y02B 20/48; Y02B 20/42; Y02B 20/44; Y02B 30/746; H05B 37/029;
(Continued)

(56) References Cited

U.S. PATENT DOCUMENTS 6,426,708 B1 7/2002 Trajkovic et al.
8,862,430 B2 10/2014 Nam et al.
(Continued)

FOREIGN PATENT DOCUMENTS

CN 201393304 Y 1/2010
CN 202183167 U 4/2012
(Continued)

OTHER PUBLICATIONS

Malik, Tarun Anand, "Target Tracking in Wireless Sensor Networks", A Thesis submitted to the Graduate Faculty of Louisiana State University and Agricultural and Mechanical College, India, May 2005.
(Continued)

*Primary Examiner* — Daniel Previl
(74) *Attorney, Agent, or Firm* — Akarsh P. Belagodu

(57) ABSTRACT

Methods and systems are provided herein for tracking vehicles' locations within a parking area. A vehicle identifier may be assigned to a vehicle entering the parking area. A plurality of light sensors may be employed in the parking area to guide the vehicle to an unoccupied parking spot and/or to determine where the vehicle is ultimately parked. In some embodiments, the plurality of light sensors may each be configured to receive and retransmit locally, e.g., to
(Continued)

neighboring light sensors, the vehicle identifier on detection of physical presence of the vehicle. In this manner, the vehicle identifier "travels" with the vehicle among the plurality of light sensors to the vehicle's final parking spot. A driver later reclaiming a vehicle may provide a vehicle identifier to a parking kiosk, which may provide output indicative of the vehicle's location in the parking area.

19 Claims, 7 Drawing Sheets

(51) Int. Cl.
*G08G 1/017* (2006.01)
*G08G 1/04* (2006.01)
*G08G 1/00* (2006.01)
*G08G 1/123* (2006.01)
*H05B 37/02* (2006.01)

(52) U.S. Cl.
CPC .............. *G08G 1/123* (2013.01); *G08G 1/142* (2013.01); *G08G 1/143* (2013.01); *G08G 1/146* (2013.01); *G08G 1/205* (2013.01); *H05B 37/0227* (2013.01); *H05B 37/0245* (2013.01)

(58) Field of Classification Search
CPC ............ H05B 37/0272; H05B 37/0218; H05B 37/0227; H05B 33/08; H05B 33/0854; H05B 33/0872; H05B 37/02; H05B 37/0236; H05B 37/0245
USPC .......... 340/932.2, 990, 991–995.11, 995.17, 340/995.25, 995.27, 427, 426.18, 465, 340/525, 539.1
See application file for complete search history.

(56) References Cited

U.S. PATENT DOCUMENTS

| | | |
|---|---|---|
| 2004/0222903 A1 | 11/2004 | Li |
| 2005/0280555 A1 | 12/2005 | Warner |
| 2006/0267799 A1 | 11/2006 | Mendelson |
| 2009/0027231 A1* | 1/2009 | Lee .................... G08G 1/14 340/932.2 |
| 2009/0098907 A1 | 4/2009 | Huntzicker et al. |
| 2010/0156672 A1 | 6/2010 | Yoo et al. |
| 2010/0238051 A1* | 9/2010 | Suzuki .................... B60R 1/00 340/932.2 |
| 2011/0320256 A1 | 12/2011 | Florucci et al. |
| 2012/0280793 A1 | 11/2012 | Fayfield et al. |
| 2013/0160671 A1* | 6/2013 | Clark .................... B61D 3/181 105/329.1 |
| 2013/0204798 A1* | 8/2013 | Gabrysch ............... G06Q 10/06 705/308 |
| 2013/0265423 A1* | 10/2013 | Bernal .............. G06Q 30/0284 348/148 |
| 2015/0046074 A1* | 2/2015 | Challapali ............. G08G 1/081 701/117 |

FOREIGN PATENT DOCUMENTS

| | | |
|---|---|---|
| CN | 102737412 A | 10/2012 |
| JP | 2012053823 A | 3/2012 |
| WO | 2004006208 A1 | 1/2004 |
| WO | 2008034779 A1 | 3/2008 |

OTHER PUBLICATIONS

Tang, V.W.S. et al., "An intelligent car park management system based on wireless sensor networks", 2006 1st International Symposium on Pervasive Computing and Applications, pp. 65-70.

* cited by examiner

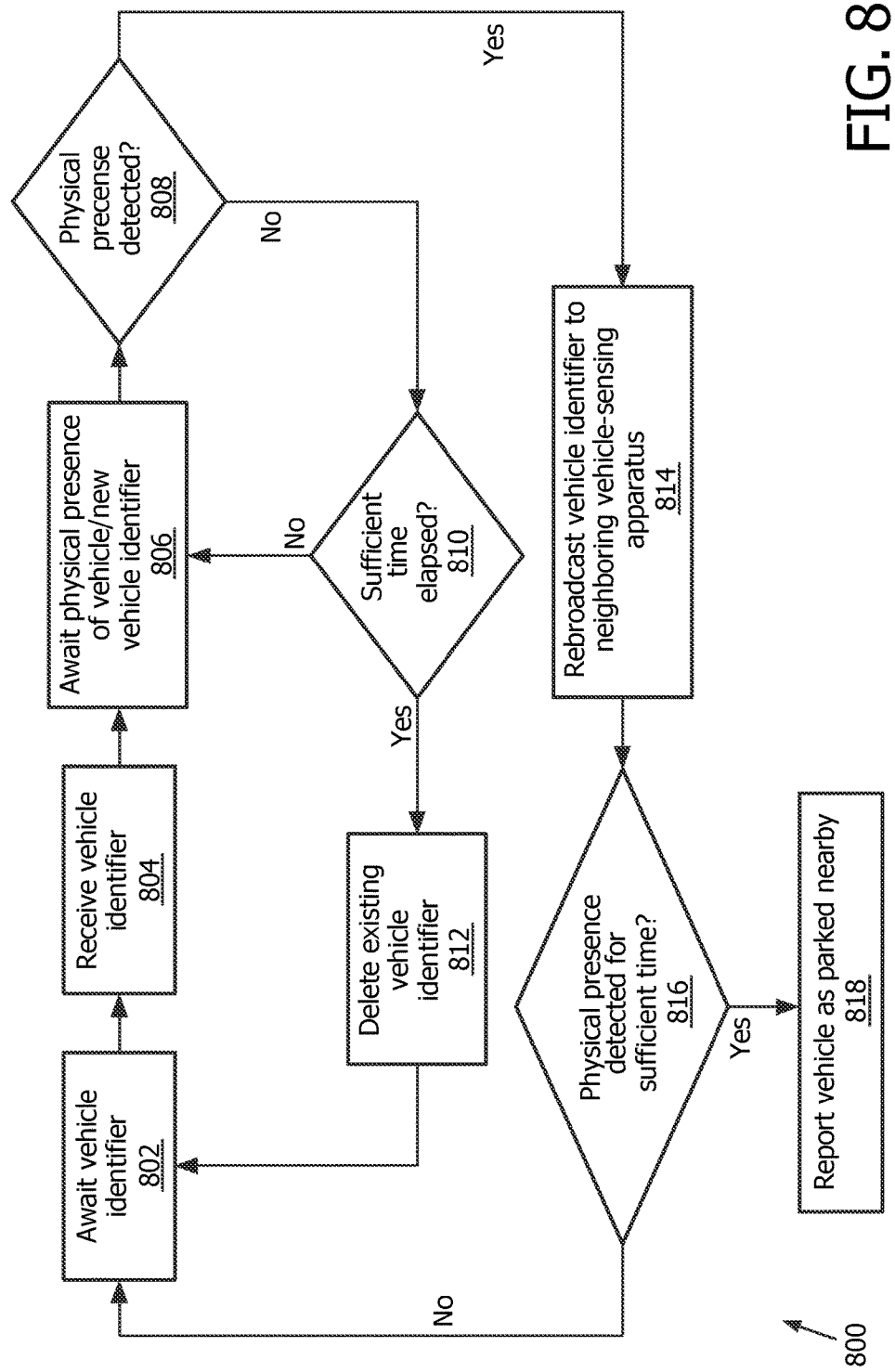

METHODS AND SYSTEMS FOR TRACKING A VEHICLE'S POSITION USING A PLURALITY OF LIGHT SENSORS

CROSS-REFERENCE TO PRIOR APPLICATIONS

This application is the U.S. National Phase application under 35 U.S.C. §371 of International Application No. PCT/IB2014/062845, filed on Jul. 4, 2014, which claims the benefit of U.S. Provisional Patent Application No. 61/843,950, filed on Jul. 9, 2013. These applications are hereby incorporated by reference herein.

TECHNICAL FIELD

The present invention is directed generally to object tracking. More particularly, various inventive methods and systems disclosed herein relate to tracking a vehicle's position within a parking area using a plurality of light sensors.

BACKGROUND

Digital lighting technologies, i.e. illumination based on semiconductor light sources, such as light-emitting diodes (LEDs), offer a viable alternative to traditional fluorescent, HID, and incandescent lamps. Functional advantages and benefits of LEDs include high energy conversion and optical efficiency, durability, lower operating costs, and many others. Recent advances in LED technology have provided efficient and robust full-spectrum lighting sources that enable a variety of lighting effects in many applications.

It is desirable for drivers seeking to reclaim vehicles parked in parking lots and/or garages to be able to find their vehicles. Many parking lots/garages are organized into sections, each being designated (e.g., using signs) with various combinations of numbers, letters and/or symbols. A driver may be expected to make note of which sign she parked closest to, so that she later can remember to return to that general section when reclaiming her vehicle. However, if a significant amount of time passes before the driver reclaims her vehicle, she may not remember which section she parked in. Or, if another driver comes to reclaim the vehicle, the other driver may have no knowledge of which section contains the vehicle.

It is also desirable to have knowledge of how many parking spots are available for use by new vehicles entering a parking lot/garage, which parking spots are occupied, and/or which parking spots are unoccupied. For example, drivers or passengers (either to which is referred to herein by the term "user") of vehicles entering the parking garage/lot may be directed to unoccupied parking spots, or incoming drivers may be warned if no parking spots exist or are only available in undesirable locations (e.g., on floors that are not handicap-accessible).

One approach to solve these problems is to track vehicles using automatic number plate recognition (ANPR) technology to capture a registration plate of a vehicle. The vehicle is tracked while in the garage by a number of infrared cameras, which feed details of where the vehicle is parked into the system. Unoccupied parking bays are highlighted to the driver using green lights. Details are printed on a ticket provided to a driver of the vehicle. On returning to reclaim her vehicle, the driver inserts the ticket into a "car finder" kiosk. The kiosk renders a three-dimensional map showing where the driver's vehicle is parked, as well as lifts and stairs that make it easier to find the vehicle.

A problem with this approach is that there is a tradeoff between the number of cameras installed versus installation costs, which may depend on the layout of the building. Moreover, if there is no overlap in the view between two cameras, or if a single camera fails, the tracing of a vehicle might be lost in the gaps between the active cameras. In these gaps, a parked car might leave and might be swapped with a traced car. Additionally, the driver must remember where her vehicle is parked after viewing the three-dimensional map. If she forgets on her way to the vehicle or misinterpreted the map to begin with, she may have trouble finding her vehicle.

Thus, there is a need in the art to provide methods and systems for tracking vehicles' positions in parking garages/lots using simpler means, as well as more robust means for showing drivers where to find their vehicles.

SUMMARY

The present invention is directed generally to object tracking. More particularly, various inventive methods and systems disclosed herein relate to tracking a vehicle's position within a parking area using a plurality of light sensors. For example, in some aspects, a vehicle's position within a parking area may be tracked using a plurality of light sensors. A vehicle identifier may be assigned to the vehicle upon entry of the vehicle into the parking area. The vehicle identifier may be provided, e.g., by a tracker computing device, to a first of the plurality of light sensors. Information indicative of a parking spot of the vehicle within the parking area may be received, e.g., by the tracker computing device, from a second of the plurality of light sensors.

In various embodiments, the plurality of light sensors may include a plurality of light emitting diodes (LEDs). In various embodiments, the vehicle identifier may be assigned to a computing device associated with the vehicle or to a mobile computing device operated by a user of the vehicle. In various embodiments, a radio frequency identification (RFID) and/or near field communication (NFC) tag may be provided to a user of the vehicle. In various versions of embodiments, the RFID or NFC tag may be provided to the user as part of a printed ticket. In various embodiments, the printed ticket may additionally or alternatively contain a barcode or quick response (QR) code that indicates the vehicle identifier.

In various embodiments, the vehicle identifier may be received, e.g., by the tracker computing device, from a user of the vehicle. Based on the vehicle identifier, the parking spot of the vehicle within the parking area based on the vehicle identifier may be determined, e.g., by the tracker computing device. Output indicative of the determined parking spot may then be provided, e.g., by the tracker computing device.

In various versions of embodiments, receiving the vehicle identifier from the user may include wirelessly receiving, e.g., by the tracker computing device, the vehicle identifier from a mobile computing device operated by the user. In various versions of embodiments, providing output indicative of the determined parking spot may include selectively illuminating, e.g., by the tracker computing device, the plurality of light sensors to demonstrate a path to the determined parking spot. In various versions of embodiments, providing output indicative of the determined parking spot may include providing, e.g., by the tracker computing device, data indicative of the determined parking spot to a mobile device operated by the user. In various versions of embodiments, providing output indicative of the determined parking spot may include causing a printer to print data indicative of the determined parking spot on a ticket provided to the user.

In various embodiments, providing the vehicle identifier may include providing, e.g., by the tracker computing device to the first of the plurality of light sensors, a proposed path to an unoccupied parking spot of the parking area.

In various embodiments, the information indicative of the parking spot of the vehicle within the parking area may include an identifier of the second sensor and the vehicle identifier. In such cases, the parking spot may be determined, e.g., by the tracker computing device, based on a predetermined map of the plurality of light sensors relative to a plurality of parking spots of the parking area and the identifier of the second sensor.

In various embodiments, the first sensor may be located near the tracker computing device and/or near an entry into the parking area monitored by the plurality of light sensors.

In various embodiments, the vehicle may be a first vehicle and the vehicle identifier may be a first vehicle identifier. In some such embodiments, an indication of an unoccupied parking spot of the plurality of predefined parking spots may be provided, e.g., by the tracker computing device, to a user of a second vehicle upon entry of the second vehicle into the parking area. In various versions, providing the indication of the unoccupied parking spot may include selectively illuminating, e.g., by the tracker computing device, the plurality of light sensors to demonstrate a path to the unoccupied parking spot. In various versions, providing the indication of the unoccupied parking spot may include providing, e.g., by the tracker computing device, data indicative of the unoccupied parking spot to a mobile device operated by a user of the second vehicle. In various versions, providing the indication of the unoccupied parking spot may include causing, e.g., by the tracker computing device, a printer to print data indicative of the unoccupied parking spot on a ticket provided to a user of the second vehicle.

As used herein for purposes of the present disclosure, the term "LED" should be understood to include any electroluminescent diode or other type of carrier injection/junction-based system that is capable of generating radiation in response to an electric signal. Thus, the term LED includes, but is not limited to, various semiconductor-based structures that emit light in response to current, light emitting polymers, organic light emitting diodes (OLEDs), electroluminescent strips, and the like. In particular, the term LED refers to light emitting diodes of all types (including semi-conductor and organic light emitting diodes) that may be configured to generate radiation in one or more of the infrared spectrum, ultraviolet spectrum, and various portions of the visible spectrum (generally including radiation wavelengths from approximately 400 nanometers to approximately 700 nanometers). Some examples of LEDs include, but are not limited to, various types of infrared LEDs, ultraviolet LEDs, red LEDs, blue LEDs, green LEDs, yellow LEDs, amber LEDs, orange LEDs, and white LEDs (discussed further below). It also should be appreciated that LEDs may be configured and/or controlled to generate radiation having various bandwidths (e.g., full widths at half maximum, or FWHM) for a given spectrum (e.g., narrow bandwidth, broad bandwidth), and a variety of dominant wavelengths within a given general color categorization.

For example, one implementation of an LED configured to generate essentially white light (e.g., a white LED) may include a number of dies which respectively emit different spectra of electroluminescence that, in combination, mix to form essentially white light. In another implementation, a white light LED may be associated with a phosphor material that converts electroluminescence having a first spectrum to a different second spectrum. In one example of this implementation, electroluminescence having a relatively short wavelength and narrow bandwidth spectrum "pumps" the phosphor material, which in turn radiates longer wavelength radiation having a somewhat broader spectrum.

It should also be understood that the term LED does not limit the physical and/or electrical package type of an LED. For example, as discussed above, an LED may refer to a single light emitting device having multiple dies that are configured to respectively emit different spectra of radiation (e.g., that may or may not be individually controllable). Also, an LED may be associated with a phosphor that is considered as an integral part of the LED (e.g., some types of white LEDs).

The term "light source" should be understood to refer to any one or more of a variety of radiation sources, including, but not limited to, LED-based sources (including one or more LEDs as defined above).

The term "lighting fixture" is used herein to refer to an implementation or arrangement of one or more lighting units in a particular form factor, assembly, or package. The term "lighting unit" is used herein to refer to an apparatus including one or more light sources of same or different types. A given lighting unit may have any one of a variety of mounting arrangements for the light source(s), enclosure/housing arrangements and shapes, and/or electrical and mechanical connection configurations. Additionally, a given lighting unit optionally may be associated with (e.g., include, be coupled to and/or packaged together with) various other components (e.g., control circuitry) relating to the operation of the light source(s). An "LED-based lighting unit" refers to a lighting unit that includes one or more LED-based light sources as discussed above, alone or in combination with other non LED-based light sources. A "multi-channel" lighting unit refers to an LED-based or non LED-based lighting unit that includes at least two light sources configured to respectively generate different spectrums of radiation, wherein each different source spectrum may be referred to as a "channel" of the multi-channel lighting unit.

The term "controller" is used herein generally to describe various apparatus relating to the operation of one or more light sources. A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

In various implementations, a processor or controller may be associated with one or more storage media (generically referred to herein as "memory," e.g., volatile and non-volatile computer memory such as RAM, PROM, EPROM, and EEPROM, floppy disks, compact disks, optical disks, magnetic tape, etc.). In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects of the present invention discussed herein. The terms "program" or "computer program" are used herein in a generic sense to refer to any type of computer code (e.g., software or microcode) that can be employed to program one or more processors or controllers.

In one network implementation, one or more devices coupled to a network may serve as a controller for one or more other devices coupled to the network (e.g., in a master/slave relationship). In another implementation, a networked environment may include one or more dedicated controllers that are configured to control one or more of the devices coupled to the network. Generally, multiple devices coupled to the network each may have access to data that is present on the communications medium or media; however, a given device may be "addressable" in that it is configured to selectively exchange data with (i.e., receive data from and/or transmit data to) the network, based, for example, on one or more particular identifiers (e.g., "addresses") assigned to it.

The term "network" as used herein refers to any interconnection of two or more devices (including controllers or processors) that facilitates the transport of information (e.g. for device control, data storage, data exchange, etc.) between any two or more devices and/or among multiple devices coupled to the network. As should be readily appreciated, various implementations of networks suitable for interconnecting multiple devices may include any of a variety of network topologies and employ any of a variety of communication protocols. Additionally, in various networks according to the present disclosure, any one connection between two devices may represent a dedicated connection between the two systems, or alternatively a non-dedicated connection. In addition to carrying information intended for the two devices, such a non-dedicated connection may carry information not necessarily intended for either of the two devices (e.g., an open network connection). Furthermore, it should be readily appreciated that various networks of devices as discussed herein may employ one or more wireless, wire/cable, and/or fiber optic links to facilitate information transport throughout the network.

The term "light sensor" as used herein may refer to any apparatus that includes a light-sensing module configured to detect the presence or absence of light, or a distance between objects detected using light reflected off one or both objects. In various embodiments, such detection may yield an inference that an object is present or absent between the light sensor and a light source. For example, a light sensor may include a light source such as an LED configured to nominally emit light towards a light-sensing module that is also part of the light sensor. Or, a light-sensing module may be configured to sense other existing light such as sunlight or moonlight, or light that is incidental from another activity (e.g., a chain reaction, a heat source, etc.). If the light-sensing module senses a temporary or permanent loss of light, or a change in distance between a light source and another object, the light-sensing module may provide appropriate output indicative of presence of an object to another component, such as a computing device or another light sensor in a network of light sensors. In other embodiments, a light-sensing module may, by default, not receive light, and may provide output indicative of presence of an object when it receives light. For example, an object may have a reflective surface that causes light to be reflected towards the light-sensing module when the object passes by.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

FIG. 8 depicts an example method that may be performed by various components of a light sensor, in accordance with various embodiments.

DETAILED DESCRIPTION

Figure 1:
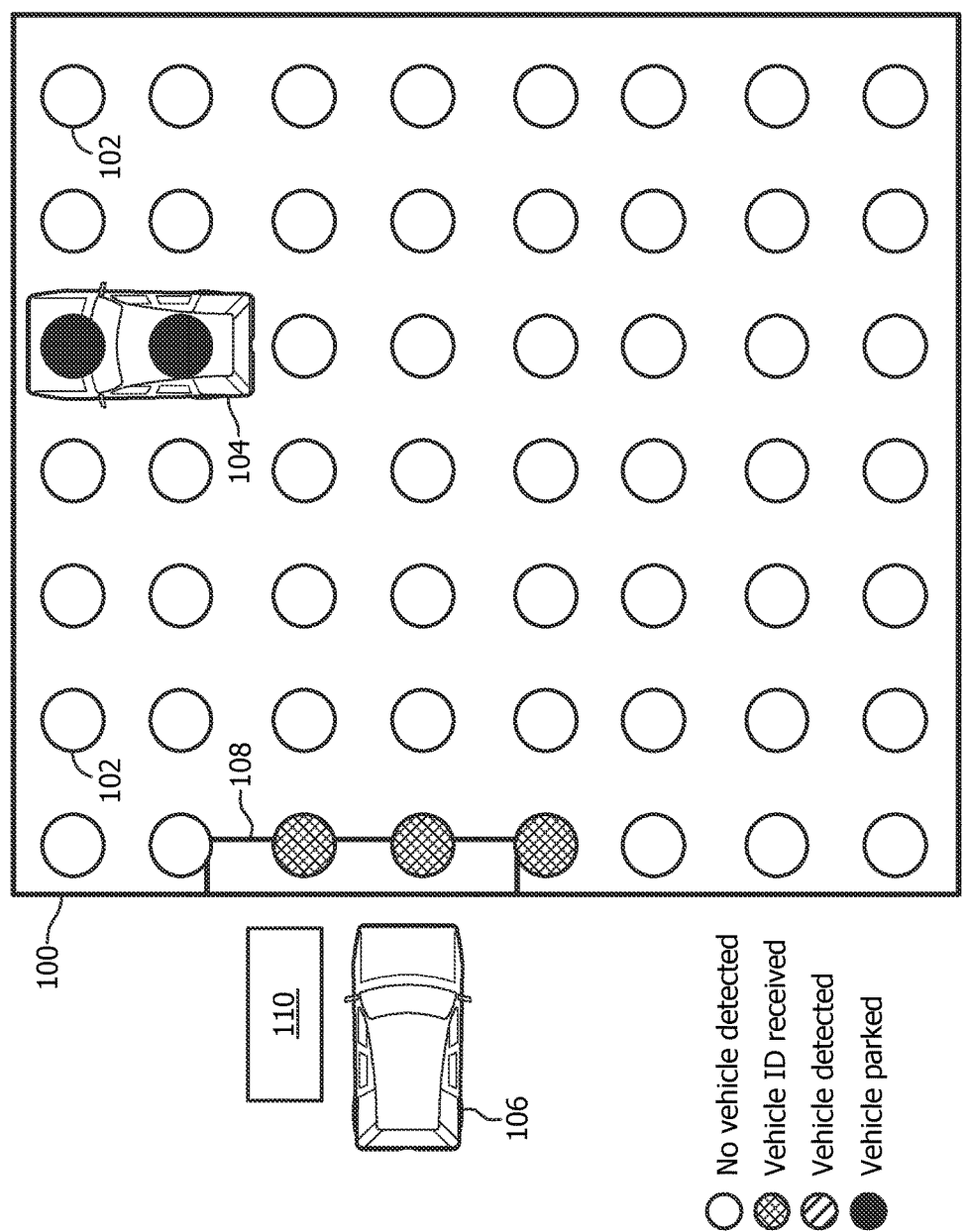
FIGS. 1-3 illustrate schematically a vehicle entering and parking within an example parking area monitored by a plurality of light sensors, in accordance with various embodiments.

It is desirable for drivers of vehicles parked in parking lots and/or garages to be able to find their vehicles later. While many parking lots/garages are organized into designated sections, a driver may not remember which section she parked in if she's returning after a long absence or was not the one to park the vehicle in the parking garage/lot originally. It is also desirable to direct drivers of vehicles entering the parking garage/lot to unoccupied parking spots, or to warn incoming drivers that no parking spots exist or are only available in undesirable locations. While automatic number plate recognition (ANPR) technology has been applied to attempt to address some of these needs/drawbacks, there is a tradeoff between the amount of cameras installed versus installation costs. Moreover, the tracing of a vehicle might be lost in gaps between active cameras. Additionally, the driver must still remember where her vehicle is parked after viewing a map.

Thus, Applicants have recognized and appreciated a need in the art to provide methods, apparatus and systems for tracking vehicles' positions in parking garages/lots using simpler means, as well as more robust means for showing drivers where to find their vehicles. More generally, Applicants have recognized and appreciated that it would be beneficial to provide reliable and inexpensive means to track vehicle locations within a parking garage lot, as well as more robust means for notifying drivers of where their cars are parked, as well as notifying new drivers where they may park their cars.

In view of the foregoing, various embodiments and implementations of the present invention are directed to vehicle tracking using light sensors.

In the following detailed description, for purposes of explanation and not limitation, representative embodiments disclosing specific details are set forth in order to provide a thorough understanding of the claimed invention. However, it will be apparent to one having ordinary skill in the art having had the benefit of the present disclosure that other embodiments according to the present teachings that depart from the specific details disclosed herein remain within the scope of the appended claims. Moreover, descriptions of well-known apparatus and methods may be omitted so as to not obscure the description of the representative embodiments. Such methods and apparatus are clearly within the scope of the claimed invention. For example, aspects of the methods and apparatus disclosed herein are described in conjunction with a lighting system having only LED-based light sources. However, one or more aspects of the methods and apparatus described herein may be implemented in other lighting systems that additionally and/or alternatively include other non-LED light sources. Implementation of the one or more aspects described herein in alternatively configured environments is contemplated without deviating from the scope or spirit of the claimed invention. Also, and for example, aspects of the methods and apparatus disclosed herein are described in conjunction with a single tracker computing device. However, one or more aspects of the methods and apparatus described herein may be implemented in other lighting systems that may include multiple tracker computing devices.

Figure 2:
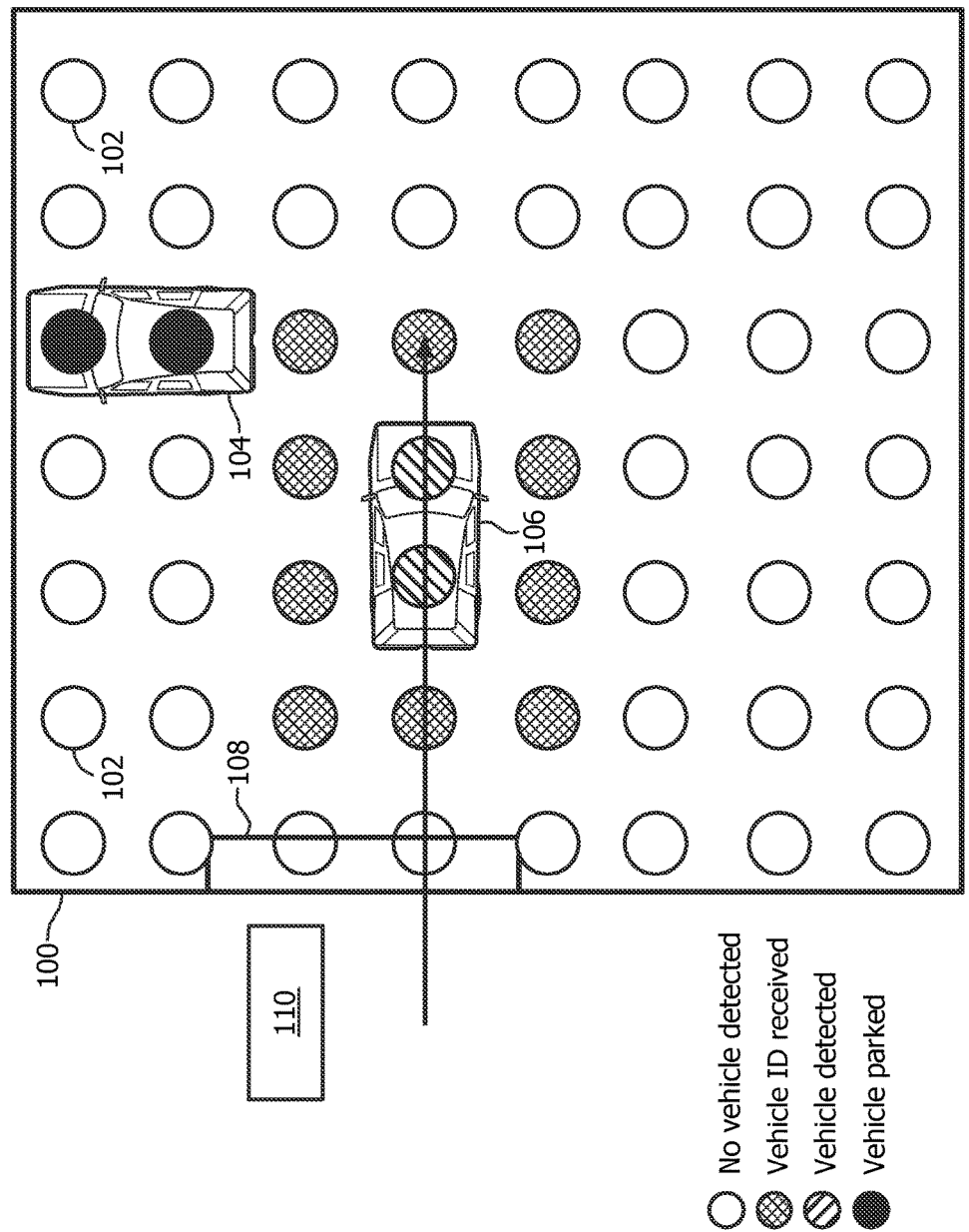
Figure 3:
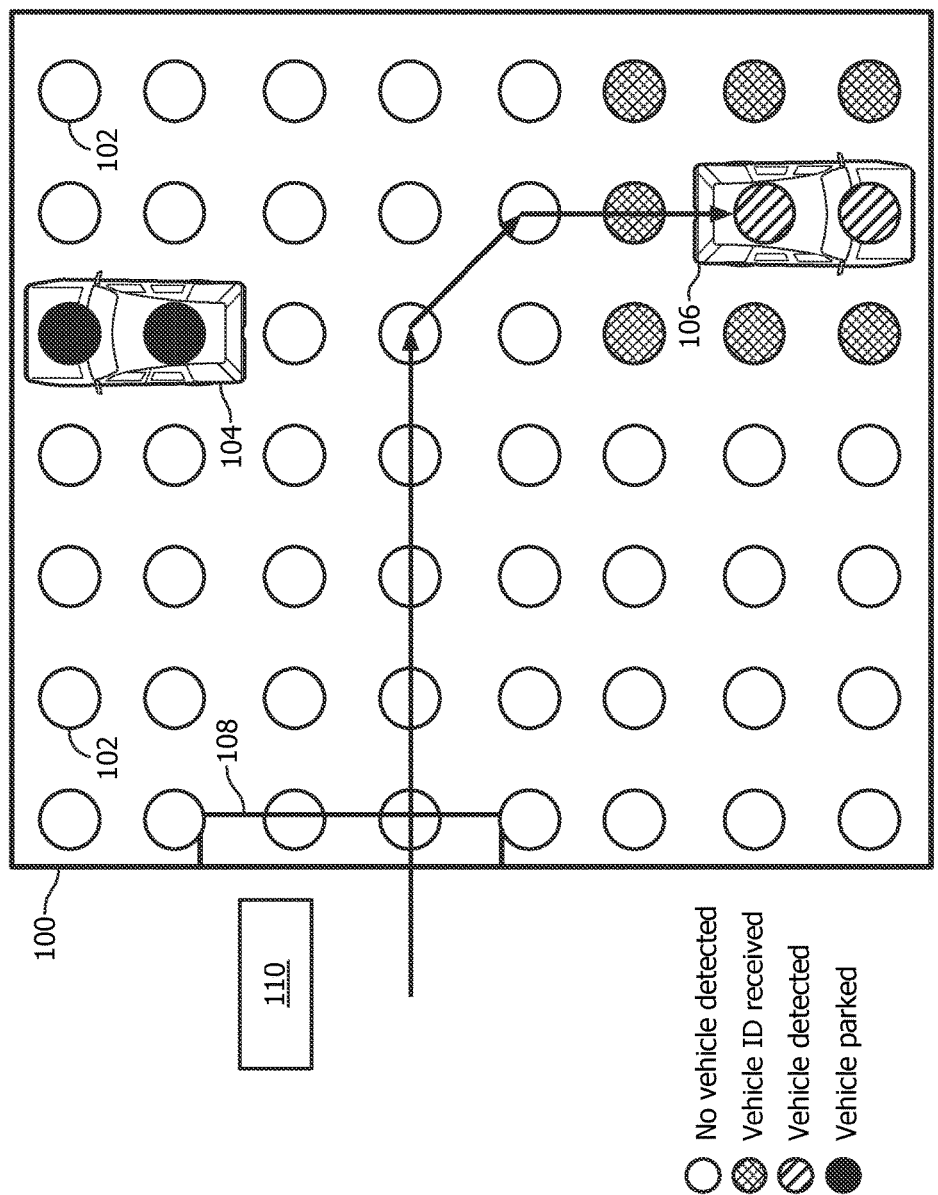

Referring to FIG. 1, in one embodiment, a parking area 100 may be monitored by a plurality of light sensors 102 (only two of which are labeled to avoid cluttering the figures) to track positions of one or more vehicles. In the scenario depicted in FIG. 1, a first vehicle 104 is already parked in parking area 100 and a second vehicle 106 is entering parking area 100 via an entry 108. It should be understood that none of the components in FIGS. 1-3 are necessarily drawn to scale. For example, parking area 100, light sensors 102 and/or entry 108 may be, in various embodiments, smaller or larger than what is depicted in FIGS. 1-3.

Plurality of light sensors 102 may be configured to detect the presence of an object such as first vehicle 104 or second vehicle 106. As will be described in more detail below with regard to FIG. 6, in various embodiments, light sensors 102 may include a light-sensing module configured to detect light emitted by a light source, or the lack thereof. For purposes of explaining FIGS. 1-3, a physical presence of a vehicle (e.g., first vehicle 104 or second vehicle 106) may be detected by a particular light sensor 102 when the vehicle "passes over" that light sensor 102. However, as explained below, in various embodiments, light sensors 102 and corresponding light sources may be positioned in a variety of ways, such as on a ceiling, floor, ground, on a vertical surface such as a wall, and so forth.

A tracker computing device 110 is depicted schematically in FIGS. 1-3 near entry 108. In various embodiments, tracker computer device 110 may be coupled with at least some, if not all, sensors 102, and may be configured to track vehicles' locations within parking area 100 using plurality of sensors 102. In various embodiments, tracker computing device 110 may be a parking kiosk similar to those commonly found at entrances of parking lots and parking garages, or may be a separate computing device in communication with one or more parking kiosks. Although not shown in FIGS. 1-3, in various embodiments, a gate may be disposed at entry 108, and may be controlled by tracker computing device 110 and/or an associated parking kiosk to permit vehicles to pass through entry 108, e.g., after a driver obtains a ticket.

In various embodiments, tracker computing device 110 may be configured to assign a vehicle identifier to a vehicle such as second vehicle 106 upon entry of second vehicle 106 into the parking area. In various embodiments, the vehicle identifier may be any combination of characters or symbols, or other digital data (e.g., random strings of zeros and ones), that uniquely identifies second vehicle 106 in the context of parking area 100. In various embodiments, once a vehicle has left parking area 100, the vehicle identifier assigned to that vehicle may be released back into a pool of available vehicle identifiers.

The vehicle identifier may be assigned to a vehicle in various ways when a user pulls up to entry 108 and, e.g., presses a button on a parking kiosk requesting a paper ticket or electronic ticket. For example, the tracker computing device 110 may transmit an electronic ticket containing the vehicle identifier to a computing device associated with second vehicle 106, such as a global positioning system (GPS) unit installed in second vehicle, a Bluetooth receiver, or a satellite radio. In various embodiments, if a driver or another passenger of second vehicle 106 possesses a mobile computing device such as a smart phone or tablet computer, tracker computing device 110 may transmit the electronic ticket to the mobile computing device, e.g., using radio transmission technology such as Bluetooth, WiFi Direct, and so forth. In various embodiments, tracker computing device 110 may provide an RFID or NFC tag to a user of the vehicle. For instance, tracker computing device 110 may cause a printer (not shown) on the parking kiosk to print a ticket that includes an embedded RFID or NFC tag that is configured to transmit the assigned vehicle identifier. In other embodiments, the driver may be provided with a printed ticket that includes a quick response (QR), another type of barcode that includes the assigned vehicle identifier, or even a simple printed combination of letters and numbers (e.g., that may be computer-readable).

In various embodiments, the plurality of light sensors 102 may be configured to communicate the vehicle identifier amongst themselves, e.g., in response to detecting physical presence of second vehicle 106. As such, in various embodiments, the vehicle identifier may be "cascaded" along plurality of light sensors 102 in a manner that follows a path traversed by second vehicle 106. This is demonstrated in FIGS. 1-3. Light sensors that have neither received a vehicle identifier nor detected the physical presence of a vehicle are without fill. Light sensors 102 that have received a vehicle identifier, e.g., from adjacent or "neighboring" light sensors, but that have not yet detected the physical presence of second vehicle 106, are filled with a grainy pattern. Light sensors 102 that have detected the presence of second vehicle 106 are filled with a pattern of diagonal lines. Light sensors 102 that have detected a physical presence of a vehicle for at least a predetermined time interval, such as might be detected by first vehicle 104 being parked long-term adjacent the corresponding light sensors 102, are filled with black.

To initiate this process, in various embodiments, tracker computing device 110 may insert the vehicle identifier into the network of light sensors 102. For example, tracker computing device 110 may provide, to a first of the plurality of light sensors 102 near entry 108 via a local broadcast, the vehicle identifier. This is depicted in FIG. 1, where three light sensors 102 near entry 108 have been provided with the vehicle identifier. It should be understood that this is simply one example of how the process may be initiated. In various embodiments, more or less sensors 102 may be provided the vehicle identifier by tracker computing device 110. In some embodiments, tracker computing device 110 may provide the vehicle identifier to all light sensors 102 in parking area 100.

In FIG. 2, second vehicle 106 has travelled into parking area 100 as shown by the arrow. Two light sensors 102 that are currently detecting the physical presence of second vehicle 106 may be broadcasting the vehicle identifier to neighboring light sensors 102. Accordingly, light sensors 102 surrounding second vehicle 106, but not currently detecting its physical presence, have received the vehicle identifier that was assigned to second vehicle 106 upon its entry into parking area 100. In some embodiments, data indicative of a proposed path to an unoccupied parking spot may be included with the vehicle identifier that is forwarded through light sensors 102. This may enable light sensor 102 to implement "intelligent" forwarding, e.g., to light sensors 102 near the proposed path, rather than simply forwarding the vehicle identifier to all neighboring light sensors 102.

In FIG. 3, second vehicle 106 has travelled to a parking spot. As was the case in FIG. 2, sensors directly above or below second vehicle 106 are currently detecting second vehicle, and may be locally broadcasting the vehicle identifier assigned to second vehicle to neighboring light sensors 102. Accordingly, as shown in FIG. 3, surrounding light sensors have received the vehicle identifier. In some embodiments, light sensors 102 may retain vehicle identifiers in memory until they are overwritten by newly-received vehicle identifiers, or until they grow "stale" and are periodically deleted (though the latter is not shown in FIGS. 2-3).

If second vehicle 106 remains in place for long enough (e.g., it has parked and the driver has left the vehicle), light sensors 102 currently detecting the physical presence of second vehicle 106 may report, e.g., to tracker computing device 110, information indicative of a parking spot of second vehicle 106 within parking area 100. In some embodiments, this information may be reported by light sensor 102 to tracker computing device 110 directly, e.g., over one or more networks. In other embodiments, this information may be reported by light sensor 102 to tracker computing device 110 indirectly. For instance, each light sensor 102 may be configured to receive such information from adjacent light sensors 102, and forward it to other adjacent light sensors 102 (e.g., towards tracker computing device 110), until the information ultimately travels through light sensors 102 to tracker computing device 110. Light sensors 102 originally reporting the parked vehicle may transition into a "vehicle parked" state, as shown by the blackened light sensors 102 underneath/above first vehicle 104.

In various embodiments, tracker computing device 110 may store the information indicative of the parking spot in memory (not shown). This information may be used later for various purposes. In various embodiments, the information indicative of the parking spot of second vehicle 106 within parking area 100 may include the vehicle identifier assigned to second vehicle 106 and/or information associated with the reporting light sensor 102. In various embodiments, the information associated with the light sensor(s) 102 that reported second vehicle 106 as being parked may include an identifier of the reporting light sensor(s) 102 (e.g., "Sensor No. 395732"). In such case, tracker computing device 110 may later determine the parking spot of second vehicle 106 based on a predetermined map (e.g., stored in memory of tracker computing device 110) of plurality of light sensors 102 relative to a plurality of parking spots of parking area 100.

Assume that a driver of first vehicle 104 returns to parking area 100 after some absence (e.g., the driver has returned to an airport parking lot after a trip) to reclaim her vehicle. The driver may not remember exactly where she parked, or may not have parked the vehicle originally. The driver may provide a vehicle identifier assigned to first vehicle 104 upon its entry into parking area 100. Tracking computing device 110 may be configured to determine the parking spot of first vehicle 104 within parking area 100 based on the vehicle identifier received from the driver, and to provide to the driver output indicative of the determined parking spot, so that the driver can find her vehicle.

The driver may provide tracker computing device 110 with the vehicle identifier in various ways. In some embodiments, tracker computing device 110 may receive the vehicle identifier from the driver wirelessly, e.g., from a mobile computing device such as a smart phone or tablet computer operated by the driver. In various embodiments, this may be the same smart phone or tablet to which the vehicle identifier was originally provided back when first vehicle 104 original entered parking area 100. In other embodiments, the vehicle identifier may be read from an RFID or NFC tag provided to the driver, e.g., as part of a printed ticket.

Output indicative of the determined parking spot may be provided to the driver in various ways. In some embodiments, tracker computing device 110 may selectively illuminate plurality of light sensors 102 to demonstrate a path to the determined parking spot. In various embodiments, this selective illumination may be static (e.g., a path to the parking spot is simply illuminated and left on, e.g., for a predetermined amount of time) or animated (e.g., the lights are illuminated in a cascading manner towards the parking spot). In various embodiments, tracker computing device 110 may selectively illuminate plurality of light sensors 102 to emit light with various properties, such as hue/color, to demonstrate a path. In some embodiments, different hues/colors may be used to demonstrate different potential paths (e.g., to different floors, different size spaces, paths intended for vehicles versus pedestrians, etc.)

In some embodiments, output indicative of the determined parking spot may be provided to a mobile device operated by the driver or another passenger. For example, data configured to enable a smart phone application to render a map of parking area 100 on a touch screen (e.g., XML, HTML, raster or vector graphical data) may be provided, by tracker computing device 110 to the smart phone using, e.g., Bluetooth, WiFi Direct, RFID, NFC, etc. The driver's parking spot may be highlighted on the rendered map. In some embodiments, GPS technology of the smart phone may be used to guide the driver to her parking spot in real time.

In some embodiments, tracker computing device 110 may cause a printer to print data indicative of the determined parking spot, e.g., on a ticket provided to the driver or on a courtesy map provided to the driver on her return to reclaim her vehicle. The driver may take this map with her, so that she need not remember where the vehicle is parked from viewing a computer-rendered map (2D or 3D) at a kiosk.

In various embodiments, tracker computing device 110 may use information about where vehicles are parked to assist other drivers. For example, tracker computing device 110 may be configured to provide, e.g., to a driver of second vehicle 106 upon entry of second vehicle 106 into the parking area, output indicative of the parking spot of first vehicle 104 (and in many cases, output indicative of a plurality of vehicles' parking spots). This may steer second driver away from parking spots that are already occupied.

In various embodiments, in addition to or instead of providing output indicative of first vehicle's parking spot, tracker computing device 110 may be configured to provide output an indication of one or more unoccupied parking spots of a plurality of predefined parking spots in parking area 100. This may guide a user, e.g., a driver of second vehicle 106, to aim directly for an unoccupied parking spot.

An indication of an unoccupied parking spot may be provided to a driver in various ways. In some embodiments, tracker computing device 110 may selectively illuminate plurality of light sensors 102 to demonstrate a path to one or more unoccupied parking spots. In some embodiments, tracker computing device 110 may be configured to provide, e.g., to a mobile device operated by a driver of second vehicle 106 or an in-vehicle GPS unit of second vehicle 106, data (e.g., HTML, XML, raster or vector image data, etc.) configured to enable rendering of a map of parking area 100 with an indication of unoccupied parking spots. In some embodiments, tracker computing device 110 may cause a printer (not shown, e.g., at a kiosk) to print data indicative of one or more unoccupied parking spots on a ticket provided to a driver of second vehicle 106.

Figure 4:
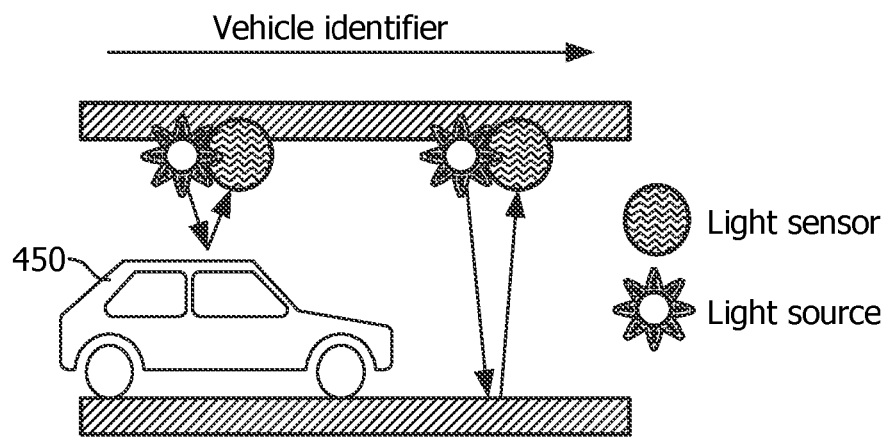
FIGS. 4-5 illustrate schematically example configurations of light sensors and light sources that may be employed in parking areas, in accordance with various embodiments.
Figure 5:
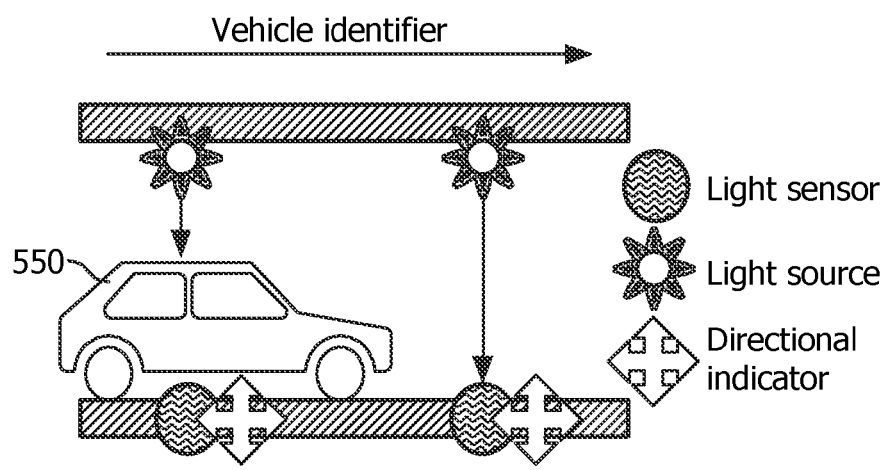

FIGS. 4-5 depict examples of how light sensors (e.g., 102 in FIGS. 1-3) may be deployed to detect vehicle presence, in accordance with various embodiments. Although light sensors and light sources are shown separately, in some embodiments, such as that shown in FIG. 6, light sources may be incorporated into a light sensor apparatus. In other embodiments, the light sources may be independent of light sensors, e.g., in the form of LED lights used to light a parking garage.

In FIG. 4, a vehicle 450 is shown traveling through an indoor parking area with a ceiling and a floor. Light sources and light sensors are periodically disposed on the ceiling adjacent one another (e.g., combined together in a single unit). In some embodiments, light emitted from a light source may be reflected off the floor or passing vehicle 450 and captured by the light sensor. In other embodiments, the light sensor may be configured to measure, e.g., utilizing light emitted from the light source, a distance between the ceiling and floor, if no vehicle is present. If vehicle 450 is present, that distance will decrease by an amount roughly corresponding to a height of vehicle 450. It should be understood that while the light sources and sensors are shown in the ceiling, this is not meant to be limiting, and in various embodiments, light sources and light sensors may additionally or alternatively be disposed on the floor or on a vertical surface such as a wall.

FIG. 5 depicts a scenario similar to that depicted in FIG. 4. Once again a vehicle 550 is passing through a parking garage with a ceiling and a floor. In this scenario, the light sources are disposed on the ceiling and the light sensors are disposed on the floor (although they may still be part of a single unit). The light sensors may be configured to detect any temporary absences of light emitted from corresponding light sources. These absences of emitted light may be indicative of a passing object, such as vehicle 550. In some embodiments, the light sensors may be configured to gauge a size of a passing object by the time taken for the object to pass over the light sensor.

In FIG. 5, directional indicators are also disposed on the floor (though they could just as easily be disposed on the ceiling, on a vertical wall, or on any combination of the floor, ceiling and wall). In various embodiments, these directional indicators may be separate from or integral with the light sensors and/or light sources. In some embodiments, the light sources themselves may be used as directional indicators. The directional indicators may be configured to provide a driver of vehicle 550 a direction in which to walk to reclaim a parked vehicle, or a direction in which an unoccupied parking spot can be found. For example, direction indicators may be configured to flash a lighted arrow or other animation in a direction that a driver should steer vehicle 550 to reach the unoccupied parking spot. In various embodiments, the directional indicators may receive, e.g., from tracker computing device 110 via cascading local broadcasts of one or more other directional indicators and/or light sensors (e.g., along with vehicle identifiers), locations of a parked vehicle or location of an unoccupied parking spot.

Of course, a driver is free to ignore the directional indication provided by a direction indicator, e.g., if a proposed parking spot is not large enough for vehicle 550. In such case, the vehicle identifier may travel amongst the plurality of light sensors in a different direction than was demonstrated by the directional indicator. In some embodiments, tracker computing device 110 may detect such a divergence, and may instruct other directional indicators to re-route vehicle 550 to a different unoccupied parking spot. In some embodiments, e.g., in response to a request from a directional indicator and/or light sensor 102 cascaded through the plurality of light sensors 102, tracking computing device 110 may broadcast a new suggested unoccupied parking spot to directional indicators and/or other nodes such as light sensors. Directional indicators may then cooperatively and/or collectively direct vehicle 550 to the new suggested parking spot.

Of course, disclosed techniques may be employed in parking areas other than enclosed parking garages with floors and ceilings. For example, on other embodiments, such as might be employed in an outdoor parking lot (e.g., without a ceiling), the light sensors may be disposed on the ground and may be photovoltaic. During the daytime, they may be powered by the sun and may detect when a vehicle passes overhead. At nighttime, the light sensors may be powered by other means and may detect the absence of other light than sunlight, such as moonlight. Or, light sources may be disposed adjacent the ground sensors and configured to emit light only at night, and the light sensors may be configured to detect this light when reflected off of a vehicle passing overhead.

Figure 6:
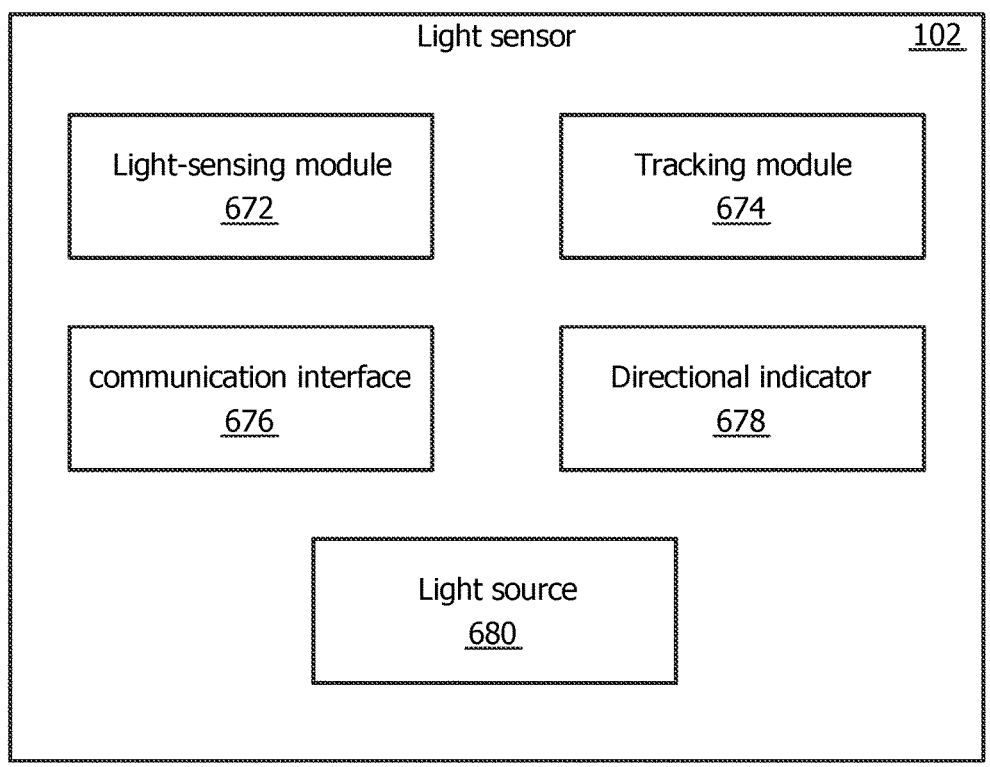
FIG. 6 illustrates schematically components of an example light sensor, in accordance with various embodiments.

FIG. 6 depicts an example light sensor 102 that may be used in conjunction with a plurality of other similar apparatus to monitor a vehicle's position within a parking area such as parking area 100. In various embodiments, light sensor 102 may include a light-sensing module 672 configured to detect presence or absence of light, or distance between objects using light. In some embodiments, light-sensing module 672 may include a photovoltaic panel that uses a light source (e.g., an LED light or sunlight) to power light sensing module 672. In other embodiments, an infrared sensor or other types of sensors configured to detect vehicle presence may be used in addition to or instead of light-sensing module 672.

A tracking module 674 may be coupled with light-sensing module 672 and may be configured to infer presence or absence of a vehicle based on output of light-sensing module 672. In various embodiments, tracking module 674 may be implemented using any combination of hardware and software.

In various embodiments, light sensor 102 may include a communication interface 676 coupled with tracking module 674. Communication interface 676 may be configured to transmit and/or receive data to and/or from other components, such as other light sensors 102. Communication interface 676 may employ various well-known and/or proprietary wired and/or wireless technologies, including but not limited to Bluetooth, IEEE 802.11, NFC, etc. to communicate with other light sensors 102 and/or tracker computing device 110. For example, communication interface 676 may be configured to receive local broadcasts of vehicle identifiers, e.g., from nearby and/or neighboring light sensors 102, and to retransmit or rebroadcast locally those vehicle identifiers to other light sensor 102, e.g., in response to detection of a vehicle's physical presence by light-sensing module 672.

In various embodiments, tracking module 674 may be configured to receive, e.g., over communication interface 676, a vehicle identifier assigned to a vehicle (e.g., 104, 106 in FIGS. 1-3, 450 in FIG. 4, 550 in FIG. 5). Tracking module 674 may provide the vehicle identifier to one or more others of the plurality of light sensors, e.g., over communication interface 676, responsive to an inference by tracking module 674 that a vehicle is physically present nearby, e.g., based on output from light-sensing module 672.

In various embodiments, tracking module 674 may be configured to selectively provide, e.g., to tracker computing device 110 over communication interface 676, a parking spot of the vehicle. For example, the selective provision may be based on a determination by tracking module 674 that the vehicle is sensed at the parking spot by light-sensing module 672 for at least a predetermined time interval (e.g., one minute, two minutes, etc.).

In various embodiments, tracking module 674 may be configured to receive, e.g., over communication interface 676, the vehicle identifier from one or more neighboring light sensors of the plurality of light sensors, e.g., on detection by the one or more neighboring light sensors of physical presence of the vehicle. As described above, this may enable the vehicle identifier to "cascade" through the plurality of light sensors to effectively travel with the physical vehicle.

In various embodiments, depending on how densely light sensors 102 are scattered throughout parking area 100, light sensor 102 may be configured to distinguish between objects of different sizes (e.g., pedestrians versus vehicles). For instance, if tracking module 672 receives, e.g., over communication interface 676, a vehicle identifier from more than a predetermined number of neighboring apparatuses, that may be indicative that an object passing overhead is a vehicle, as opposed to a smaller object such as a person. In such case, tracking module 674 may be configured to provide, e.g., over communication interface 676 to one or more others of the plurality of light sensors 102, an announcement that the passing object is a vehicle (e.g., rather than a person), or that the vehicle is at least a predetermined size.

In various embodiments, tracking module 674 may be configured to determine, based on repeated detection by the light sensor of physical presence of vehicles over time, its location type. A "location type" may include whether the light sensor is located at a parking spot, at pathway in the parking area, or somewhere in between. If, when vehicles are physically detected, they typically remain stationary for some time, tracking module 674 may infer that light sensor 102 is located at a parking spot. On the other hand, if physical detection of vehicles is typically fleeting, tracking module 674 may infer that light sensor 102 lies on a path to/from parking spots. If vehicles are both physically detected for extended periods and vehicle identifiers are periodically received from neighboring light sensors 102 without corresponding physical vehicle detection, tracking module 674 may infer that it lies between a parking spot and a path. In other embodiments, light sensors 102 may be manually configured as parking spot, pathway or in between nodes.

Once light sensor 102 determines (or is manually configured with) its location type, tracking module 674 may be configured to make other determinations. For example, a tracking module 674 of a light sensor 102 with a location type of "pathway" may be configured to infer that a vehicle is blocking the path where the vehicle's physical presence is detected by light-sensing module 672 for more than a predetermined threshold. In such case, light sensor 102 may report the blockage to tracker computing device 110, directly (e.g., over one or more networks) or indirectly (e.g., by forwarding the notification through other light sensors towards tracker computing device 110). As another example, light sensors 102 designated as "parking spot" nodes may have lower temporal thresholds for concluding that a vehicle is parked; i.e. they may need less time to determine that a car is parked.

In various embodiments, light sensor 102 may further include a directional indicator 678. As mentioned above, directional indicator 678 may include one or more lights, such as LEDs, that are configured to illuminate a direction in which a driver should go. Light sensor 102 may also include a light source 680, which may be coupled with tracking module 674 and/or other components of light sensor 102, and in some cases may also function as a directional indicator 678. As noted above, light source 680 may be an LED or another type of light source. In various embodiments, light source 680 may be configured to emit light in a direction of light-sensing module 672. As noted above, when light-sensing module 672 outputs an absence of that light, tracking module 674 may infer presence or absence of a vehicle nearby. Light source 680 is depicted in FIG. 6 in close proximity to light-sensing module 672, such as might be the case in FIG. 4. However, in other embodiments, light-sensing module 672 and light source 680 may not be as close together, such as where one is disposed on a floor of a parking garage and the other is disposed on a ceiling, as shown in FIG. 5. In yet other embodiments, light sensor 102 may not include a light source all. Instead, light-sensing module 672 may be configured to sense light (or the lack thereof) from other exiting light sources, such as natural light or lights of a vehicle (e.g., headlights, parking lights, interior lights, etc.).

A situation may arise where light sensor 102 detects the presence of an "orphan" vehicle for which it has not received a vehicle identifier. This may occur when, e.g., the last received vehicle identifier grew stale and was deleted, or when sensor coverage in a particular parking area is insufficient and a vehicle identifier did not successfully travel through the plurality of light sensors 102 along with the vehicle. In some embodiments, tracking module 674 may simply generate a vehicle identifier locally (e.g., randomly), and may broadcast this vehicle identifier to adjacent light sensors 102 for use in tracking the vehicle. The newly generated vehicle identifier may be forwarded to tracking computing device 110, which may attempt to match it to vehicle identifiers assigned at entry 108 but that were never associated with a particular parking spot. In other embodiments, communication interface 676 may be configured to obtain a vehicle identifier from an orphan vehicle for which no corresponding vehicle identifier has been received, e.g., using wireless technologies such as Bluetooth, WiFi Direct, etc.

Figure 7:
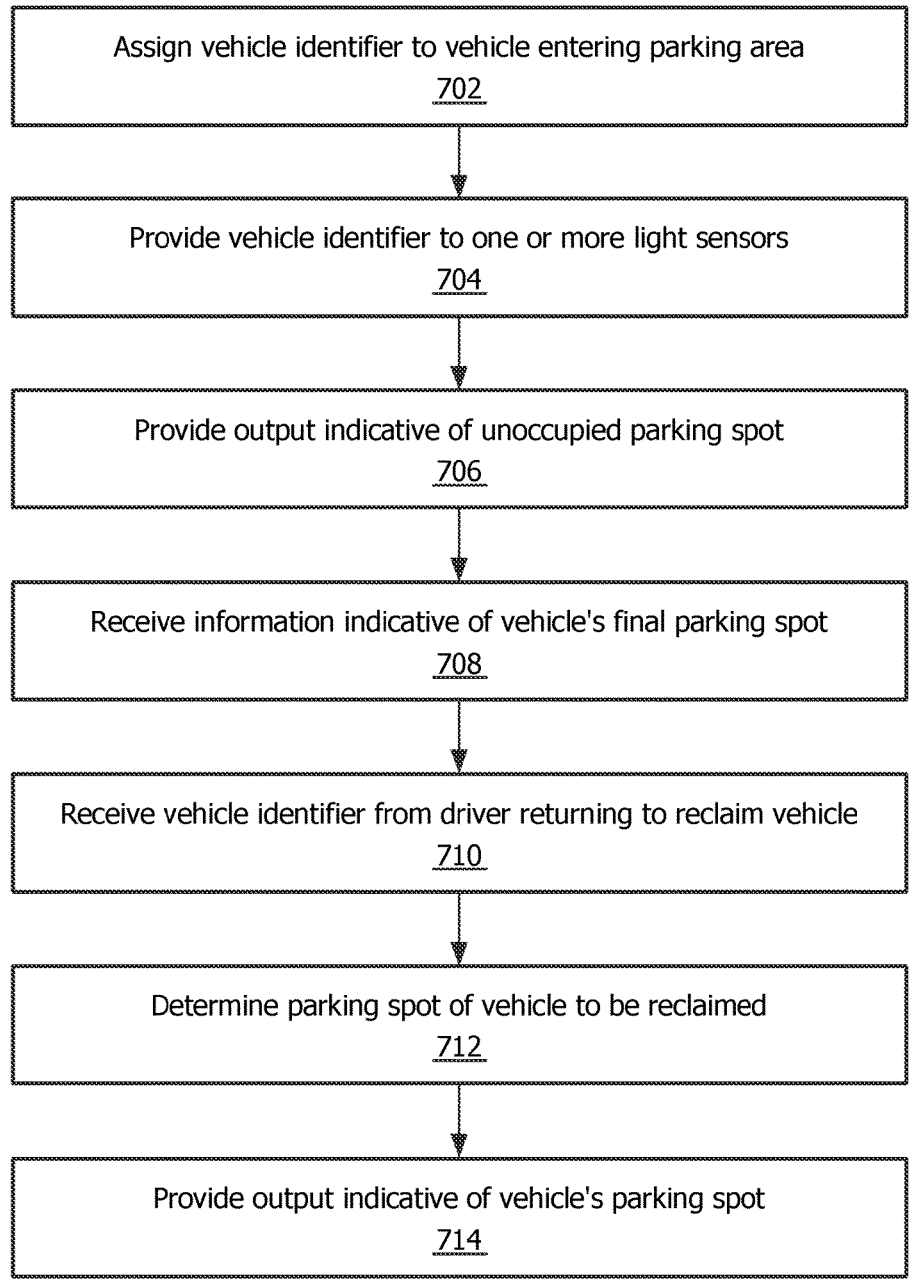
FIG. 7 depicts an example method of tracking a vehicle's position within a parking area, in accordance with various embodiments.

FIG. 7 depicts an example method 700 that may be implemented by a computing device such as tracker computing device 110, in accordance with various embodiments. While shown in a particular order, this is not meant to be limiting. Various operations may be performed in a sequence different than that shown, and various operations may be added or omitted.

At block 702, a vehicle identifier may be assigned, e.g., by tracker computing device 110, to a vehicle (e.g., 104, 106, 450, 550) upon entry of the vehicle into the parking area (e.g., 100). As noted above, the vehicle identifier may be assigned to the vehicle in various ways, such as to a computing device associated with the vehicle (e.g., in-vehicle GPS unit) or a mobile computing device (e.g., smart phone) operated by a driver of the vehicle. As another example, an RFID or NFC tag may be provided to a driver of the vehicle, e.g., by tracker computing device 110 and/or a kiosk in communication with tracker computing device 110 (e.g., embedded in a printed ticket).

At block 704, the vehicle identifier may be provided, e.g., by tracker computing device 110 to one or more light sensors (e.g., 102), such as those located near entry 108. In various embodiments, provision of the vehicle identifier from tracker computing device 110 to a light sensor, as well as between light sensors, may occur using various wireless or wired technologies. Provision of the vehicle identifier to these initial light sensors may initiate the "cascade" of the vehicle identifier through the plurality of light sensors that detect physical presence of the vehicle. In some embodiments, the vehicle identifier may be accompanied by data indicative of a proposed path, e.g., to an unoccupied parking spot. This proposed path may be used by tracking modules 674 of intermediate light sensors 102 to selectively illuminate light sources 680 and/or directional indicators 678 to guide the driver to a particular parking spot.

At block 706, output indicative of an unoccupied parking spot may be provided, e.g., by tracker computing device 110 or an associated parking kiosk, to a driver of the vehicle. As noted above, this output may come in the form of the plurality of light sensors and/or directional indicators being selectively illuminated (e.g., by tracker computing device 110 or by the nodes themselves based on received data indicative of a proposed path) to demonstrate a path to the unoccupied parking spot. This output may also come in the form of data indicative of the unoccupied parking spot being provided to a mobile device operated by a driver of second vehicle 106 or printed on a ticket provided to a driver of second vehicle 106.

Once the driver has parked the vehicle within the parking area, at block 708, information indicative of the ultimate parking spot of the vehicle within the parking area may be received, e.g., by tracker computing device 110, from a light sensor located at or near the parking spot where the vehicle was parked. In some embodiments, this information may be provided by the light sensor directly to tracker computing device 110, e.g., over one or more wireless or wired network connections. In some embodiments, this information may be forwarded by light sensor 102 to other adjacent light sensors 102, which in turn may also forward the information to yet other adjacent light sensors 102, until the information finally reaches tracker computing device 110.

When the driver later returns to the parking area to reclaim the vehicle, at block 710, the vehicle identifier may be received, e.g., by tracker computing device 110 and/or a parking kiosk in communication with tracker computing device, from a driver of the vehicle. For example, the driver may insert a ticket into a kiosk or tap her phone against an NFC receiver, either which may provide the vehicle identifier to tracker computing device 110.

At block 712, the parking spot of the vehicle within the parking area may be determined, e.g., by tracker computing device 110 based on the vehicle identifier provided by the driver. For example, tracker computing device 110 may cross reference the vehicle identifier against a database of vehicle identifiers assigned to vehicles parked in the parking area and corresponding light sensor identifiers associated with light sensors that reported those vehicles being parked. Once the light sensor identifier(s) corresponding to the driver's vehicle identifier are determined, tracker computing device 110 may cross reference the light sensor identifier(s) against a predetermined map of the plurality of light sensors relative to a plurality of parking spots of the parking area, to determine where the vehicle is parked. In other embodiments, locations of the sensors may be commissioned with location information.

At block 714, output indicative of the determined parking spot may be provided to the driver, e.g., by tracker computing device 110 or a parking kiosk in communication with tracker computing device 110. For example, as noted above, the plurality of light sensors and/or directional indicators may be selectively illuminated to demonstrate a path to the determined parking spot, or data indicative of the determined parking spot may be provided to a mobile device operated by the driver and/or printed on a ticket provided to the driver.

FIG. 8 depicts an example method 800 that may be implemented by various components of light sensor 102, such as tracking module 674, in accordance with various embodiments. As was the case with method 700, the particular order of operations depicted in FIG. 8 is not meant to be limiting. Various operations may be performed in a sequence different than that shown, and various operations may be added or omitted.

At block 802, the light sensor 102 may await receipt of a vehicle identifier. At block 804, a vehicle identifier may be received over communication interface 676 from, e.g., tracker computing device 110, an associated kiosk, or another light sensor 102. After receiving a vehicle identifier at block 804, at block 806, light sensor 102 may await detection of a physical presence of a vehicle or receipt of a new vehicle identifier (e.g., if the vehicle never physically passed between light-sensing module 672 and light source 680). In some embodiments, until a vehicle is detected, a vehicle identifier received at block 804 or 806 may be stored or otherwise designated as a "last received vehicle identifier." If no physical presence is detected at block 808, then at block 810 it may be determined whether a sufficient amount of time has passed since receipt of the last received vehicle identifier at block 804 or 806. If the answer is yes (i.e., the last received vehicle identifier has grown "stale"), then at block 812, tracking module 674 may delete the last received vehicle identifier, and method 800 may proceed back to block 802.

Back at block 808, if a vehicle's physical presence is detected, then at block 814, tracking module 674 may rebroadcast the vehicle identifier locally over communication interface 676, e.g., to neighboring light sensors 102. In some embodiments, tracking module 674 may also store or mark the last received vehicle identifier it received at block 804 as a "detected vehicle identifier." As mentioned above, in embodiments where proposed path information accompanies the vehicle identifier across the plurality of light sensors 102, tracking module 674 may "intelligently" forward the vehicle identifier/proposed path only to those neighboring light sensors 102 on or near the proposed path.

If at block 816 it is determined that the vehicle's physical presence has been detected for a sufficient amount of time, e.g., suggesting that the vehicle has parked, then at block 818, light sensor 102 may report, e.g., to tracker computing device 110 over communication interface 676, that the vehicle is parked. This report may also include, for instance, an identifier associated with the reporting light sensor 102, to enable tracker computing device 110 to locate light sensor 102 on a map of parking area 100. When the vehicle leaves later, method 800 may return to block 802.

If at block 816 the vehicle's physical presence is not detected for a sufficient amount of time, that may indicate that the vehicle has not parked there and has moved on. In such case, method may return to block 802, and light sensor 102 may await further vehicle identifiers.

While the embodiments described herein have been directed generally to tracking vehicle locations within a parking area, it should be understood that disclosed techniques may be employed in other indoor and outdoor object-tracking applications.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

It should also be understood that, unless clearly indicated to the contrary, in any methods claimed herein that include more than one step or act, the order of the steps or acts of the method is not necessarily limited to the order in which the steps or acts of the method are recited. Also, reference numerals appearing in the claims between parentheses, if any, are provided merely for convenience and should not be construed as limiting the claims in any way.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A method of tracking a vehicle's position within a parking area using a plurality of light sensors, the method comprising:
    assigning a vehicle identifier to the vehicle upon entry of the vehicle into the parking area, wherein the parking area is monitored by the plurality of light sensors;
    providing, by a tracker computing device to a first of the plurality of light sensors, the vehicle identifier;
    when the vehicle is parked in a parking spot within the parking area, receiving, by the tracker computing device from a second of the plurality of light sensors, information indicative of the parking spot where the vehicle is parked within the parking area, and
    after the vehicle is parked in the parking spot:
    receiving, by the tracker computing device from a user of the vehicle, the vehicle identifier;
    determining, by the tracker computing device, based on the vehicle identifier, the parking spot where the vehicle is parked within the parking area; and
    providing to the user, by the tracker computing device, output indicative of the determined parking spot where the vehicle is parked.

2. The method of claim 1, wherein the assigning comprises assigning the vehicle identifier to a computing device associated with the vehicle or a mobile computing device operated by a user of the vehicle.

3. The method of claim 1, wherein receiving the vehicle identifier from the user comprises wirelessly receiving, by the tracker computing device, the vehicle identifier from a mobile computing device operated by the user.

4. The method of claim 1, wherein providing output indicative of the determined parking spot where the vehicle is parked comprises selectively illuminating, by the tracker computing device, the plurality of light sensors to demonstrate a path to the determined parking spot where the vehicle is parked.

5. The method of claim 1, wherein providing output indicative of the determined parking spot where the vehicle is parked comprises providing, by the tracker computing device, data indicative of the determined parking spot where the vehicle is parked to a mobile device operated by the user.

6. The method of claim 1, wherein providing the vehicle identifier comprises providing, by the tracker computing device to the first of the plurality of light sensors, a proposed path to an unoccupied parking spot of the parking area.

7. The method of claim 1, wherein the information indicative of the parking spot of the vehicle within the parking area comprises an identifier of the second sensor and the vehicle identifier, and the method further comprises determining, by the tracker computing device, the parking spot based on a predetermined map of the plurality of light sensors relative to a plurality of parking spots of the parking area and the identifier of the second sensor.

8. The method of claim 1, wherein the vehicle is a first vehicle and the vehicle identifier is a first vehicle identifier, the method further comprising providing, by the tracker computing device to a user of a second vehicle upon entry of the second vehicle into the parking area, an indication of an unoccupied parking spot of the plurality of predefined parking spots.

9. The method of claim 8, wherein providing the indication of the unoccupied parking spot comprises selectively illuminating, by the tracker computing device, the plurality of light sensors to demonstrate a path to the unoccupied parking spot.

10. The method of claim 8, wherein providing the indication of the unoccupied parking spot comprises providing, by the tracker computing device, data indicative of the unoccupied parking spot to a mobile device operated by a user of the second vehicle.

11. The light sensor of claim 1, wherein the selective provision is based on a determination that the vehicle is sensed at the parking spot by the light sensor for at least a predetermined time interval.

12. The method of claim 1, wherein the method further comprises transmitting, by a third light sensor of the plurality of light sensors that is distinct from the first and the second of the plurality of light sensors and from the tracker computing device, the vehicle identifier to the second of the plurality of light sensors on condition that said vehicle is physically detected by the third light sensor.

13. The method of claim 12, wherein the transmitting by the third light sensor is performed prior to entering of the vehicle in the parking spot.

14. A first light sensor for use in tracking a vehicle's position in a parking area, comprising:
 a light-sensing module configured to detect physical presence of a vehicle;
 a communication interface; and
 a tracking module coupled with the light-sensing module and the communication interface and configured to:
 receive, over the communication interface, a vehicle identifier assigned to a vehicle; and
 provide, over the communication interface, the vehicle identifier to one or more others of a plurality of light sensors used to track the vehicle's position within the parking area responsive to detection of the physical presence of the vehicle by the first light sensor,
 wherein the tracking module is configured to receive, over the communication interface, the vehicle identifier from one or more neighboring light sensors of the plurality of light sensors on detection by the one or more neighboring light sensors of physical presence of the vehicle, wherein the tracking module is further configured to provide, to the one or more others of the plurality of light sensors in response to receiving the vehicle identifier from the one or more neighboring light sensors more than a predetermined number of times, an announcement that a passing object is a vehicle.

15. The light sensor of claim 14, wherein the tracking module is configured to receive the vehicle identifier from a tracker computing device that is located near, or is associated with a parking kiosk that is located near, an entry into the parking area monitored by the plurality of light sensors.

16. The light sensor of claim 14, wherein the one or more others of the plurality of light sensors are one or more neighboring light sensors.

17. The light sensor of claim 14, wherein the tracking module is further configured to determine, based on repeated detection by the light sensor of physical presence of vehicles over time, whether the light sensor is located at a parking spot or pathway in the parking area.

18. The first light sensor of claim 14, wherein the tracking module is configured to provide the vehicle identifier to said one or more others of the plurality of light sensors, prior to entering of the vehicle in a parking spot, on condition that said vehicle is physically detected by the light-sensing module of the first light sensor.

19. A vehicle position tracking system, comprising:
 a tracker computing device; and
 a plurality of light sensors in communication with the tracker computing device to monitor a parking area for physical presence of vehicles;
 wherein the tracker computing device is configured to:
 assign a vehicle identifier to a given vehicle on passage of the given vehicle through an entry into the parking area;
 provide, to a first of the plurality of light sensors, the vehicle identifier;
 when the given vehicle is parked in a parking spot within the parking area, receive, from a second of the plurality of light sensors, information indicative of the parking spot where the given vehicle is parked within the parking area and,
 after the given vehicle is parked in the parking spot:
 receive from a user of the given vehicle, the vehicle identifier;
 determine, based on the vehicle identifier, the parking spot where the given vehicle is parked within the parking area; and
 provide to the user output indicative of the determined parking spot where the given vehicle is parked.

* * * * *